Nov. 2, 1965    O. W. JOHNSON    3,215,129
ROTARY INTERNAL COMBUSTION MOTOR
Filed Feb. 15, 1965    4 Sheets-Sheet 1
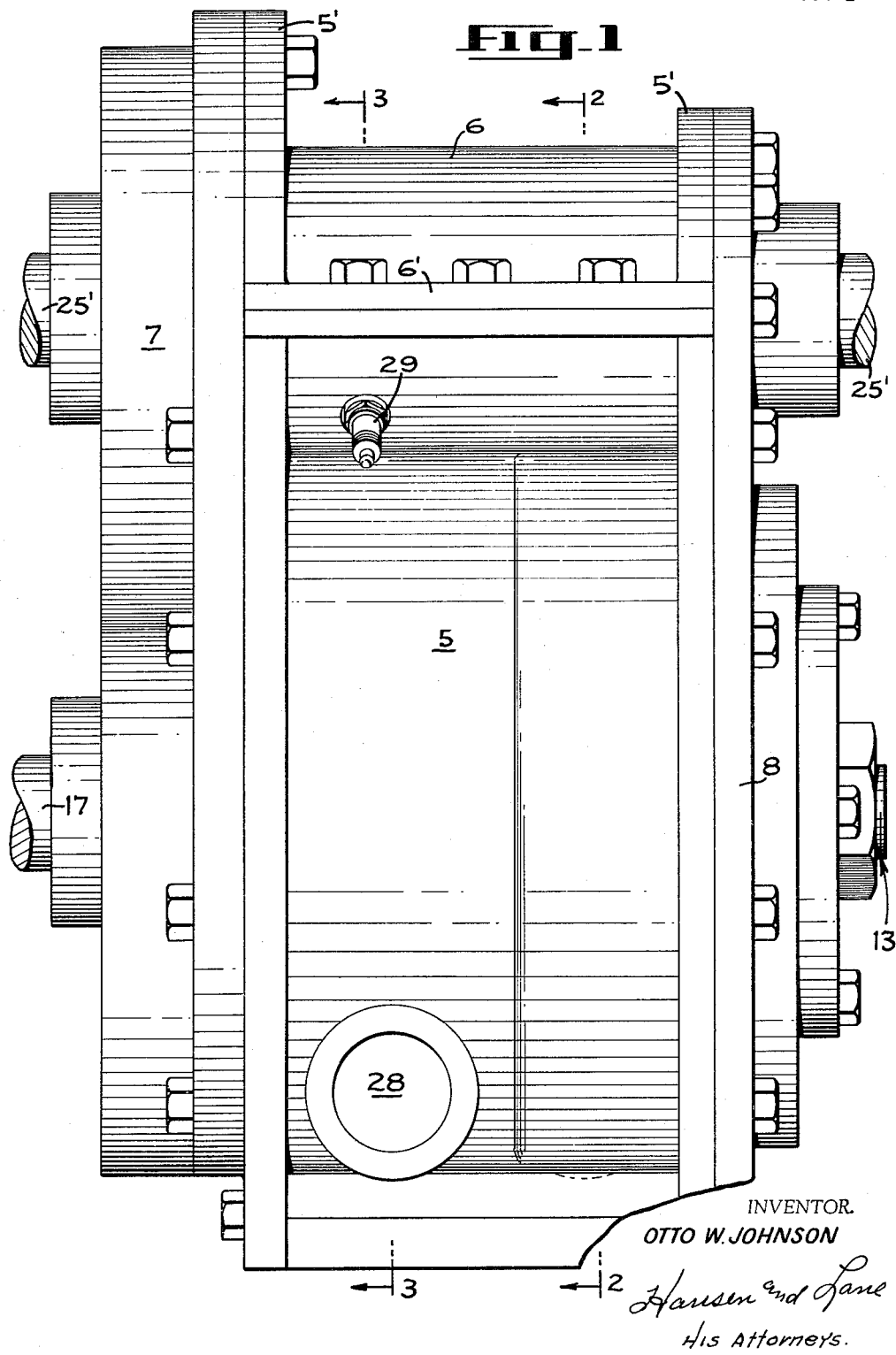
INVENTOR.
OTTO W. JOHNSON
Hansen and Lane
His Attorneys.

Nov. 2, 1965     O. W. JOHNSON     3,215,129
ROTARY INTERNAL COMBUSTION MOTOR
Filed Feb. 15, 1965     4 Sheets-Sheet 2
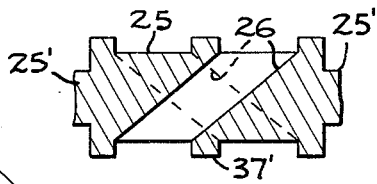
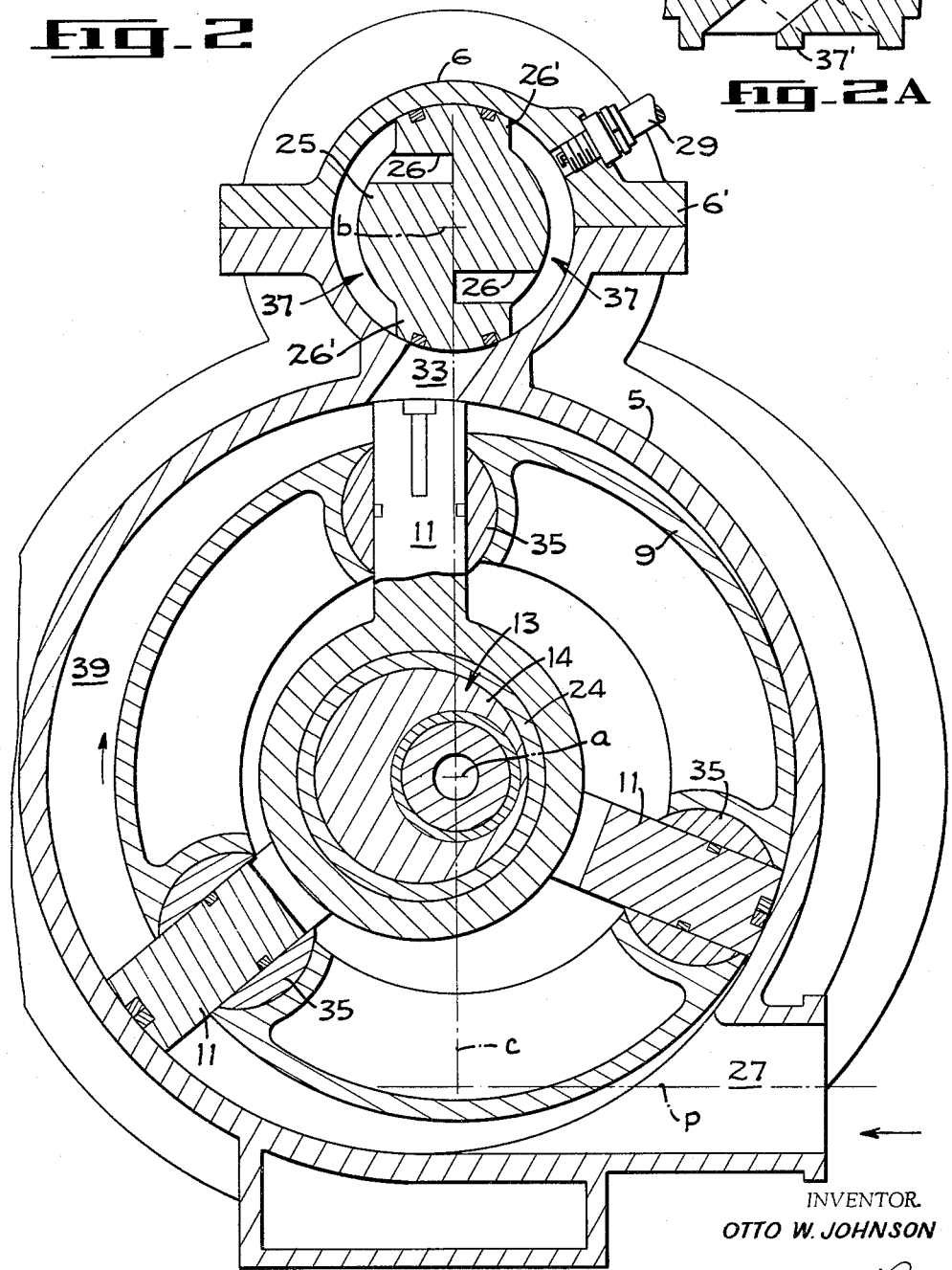
INVENTOR.
OTTO W. JOHNSON
Hansen and Lane
HIS ATTORNEYS.

Nov. 2, 1965     O. W. JOHNSON     3,215,129
ROTARY INTERNAL COMBUSTION MOTOR
Filed Feb. 15, 1965     4 Sheets-Sheet 3
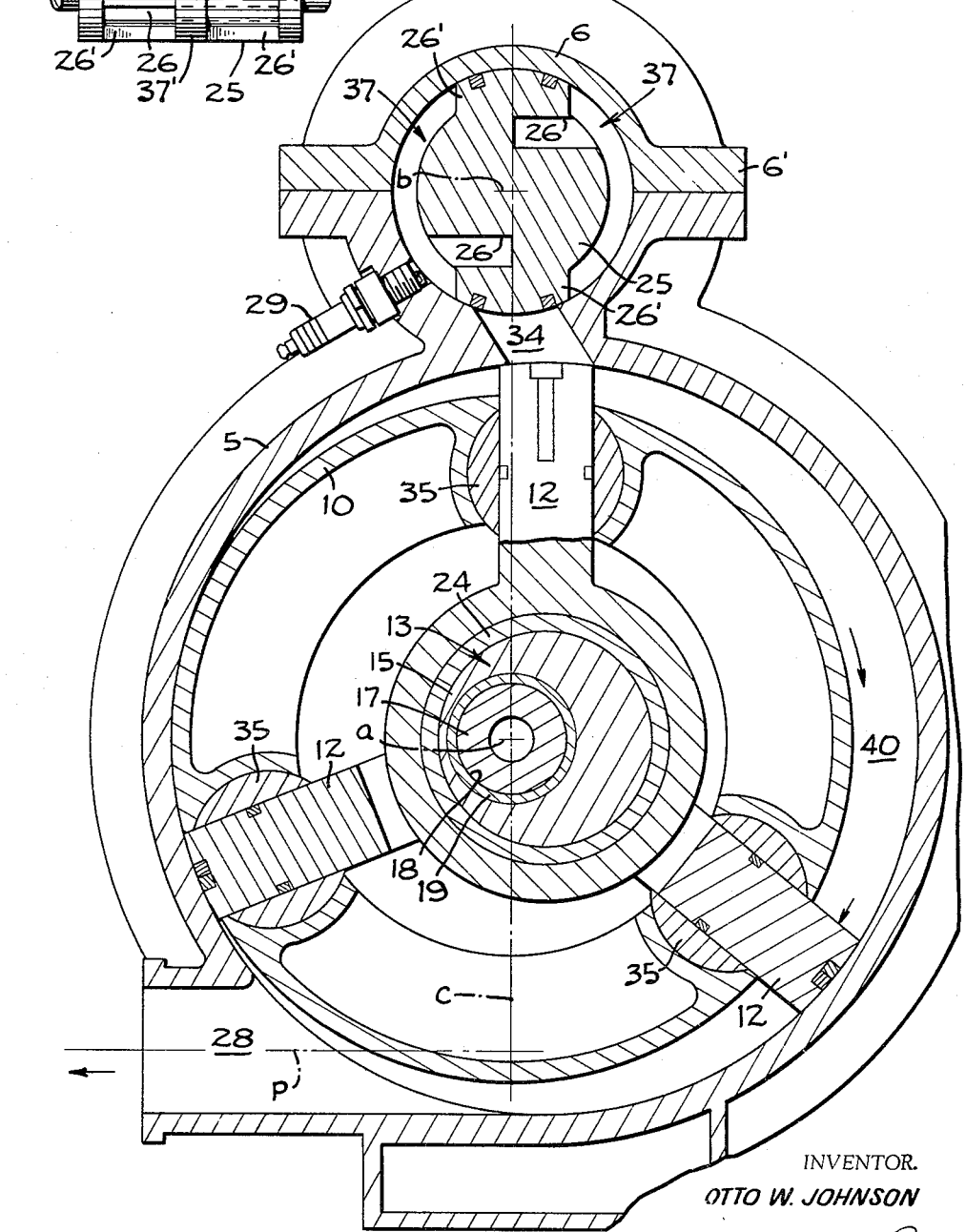
INVENTOR.
OTTO W. JOHNSON
Hansen and Lane
HIS ATTORNEYS.

Nov. 2, 1965  O. W. JOHNSON  3,215,129
ROTARY INTERNAL COMBUSTION MOTOR
Filed Feb. 15, 1965  4 Sheets-Sheet 4
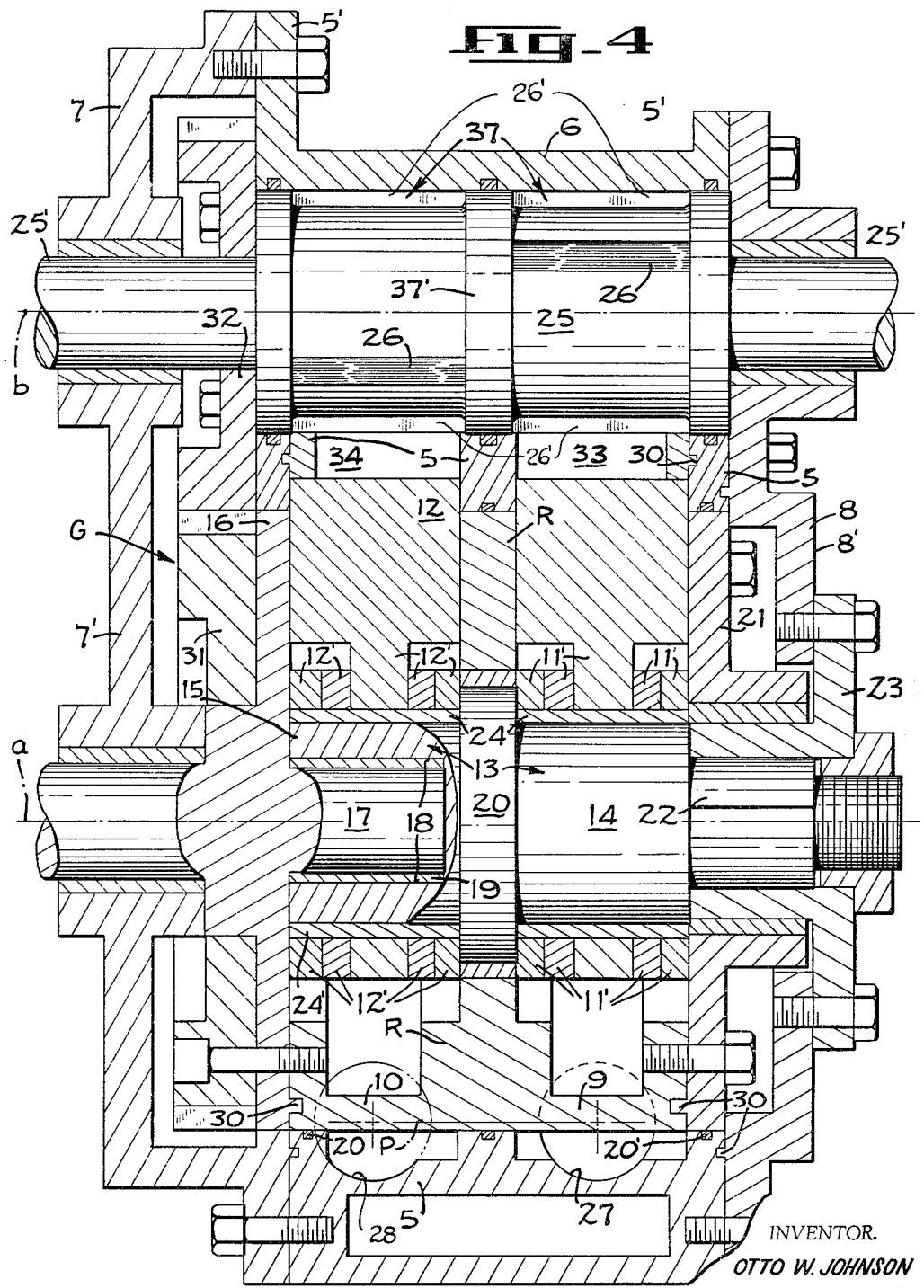
INVENTOR.
OTTO W. JOHNSON
Hansen and Lane
HIS ATTORNEYS.

United States Patent Office 3,215,129
Patented Nov. 2, 1965

3,215,129
ROTARY INTERNAL COMBUSTION MOTOR
Otto W. Johnson, 44 Euclid Ave., Los Gatos, Calif.
Substituted for abandoned application Ser. No. 142,576, Oct. 3, 1961. This application Feb. 15, 1965, Ser. No. 432,462
4 Claims. (Cl. 123—16)

This application is a substitution of application No. 142,576, filed Oct. 3, 1961, now abandoned.

This invention relates to internal combustion motors and more particularly a rotary type of such motor.

The invention contemplates the provision of a rotary type internal combustion motor in which a single rotor confined within a housing is divided to provide a combustion unit on one side thereof and a compression unit on the other side thereof, and a transfer valve for intermittently admitting fuel air mixture from the compression unit into the combustion unit in timed relation with the operation of such rotor.

It is an object of this invention to provide in a rotary internal combustion motor having a divided rotor in a single housing, a transfer valve operable in timed relation with the rotor for receiving fuel under compression from one side thereof for igniting the same for alternate discharge into the other side thereof.

It is another object of this invention to provide in a common housing in which a fixed shaft and a drive shaft are supported concentric to each other, offset combustion and compression chambers concentric to eccentric portions of such fixed shaft and interrelated with vanes turnable on said eccentric shaft portions and concentric to the respective chambers, and a common divided rotor on such fixed shaft connected to such drive shaft and having rockable guide means on its divided peripheries for guiding such vanes during rotation of said eccentrically mounted vanes with the concentrically mounted rotor. In this connection it is a still further object to provide a transfer valve on such common housing for receiving compressed fuel from the compression chamber, isolating such compressed fuel during igniting thereof and for discharging expanding ignited fuel into the combustion chamber of such housing for driving the vanes therein to drive said rotor.

These and other objects and advantages of the present invention will become apparent from a reading of the following description and claims in the light of the drawings in which:

FIG. 1 is a side elevational view of the motor.

FIG. 2 is a section through FIG. 1 taken along line 2—2 thereof to illustrate the compression side of the motor.

FIG. 2A is a reduced section through a transfer valve body showing the disposition of diagonal passages therethrough.

FIG. 3 is a section through FIG. 1 taken along line 3—3 thereof to illustrate the combustion side thereof.

FIG. 3A is a fragmentary elevation of the transfer valve body.

FIG. 4 is a vertical section through FIGS. 2 and 3 at the axes of the motor and transfer valve thereof.

Referring to the drawings the numeral 5 generally indicates a housing having flanges 5' at each of its ends and an upper flange 6' to which is secured a cap 6 forming the housing for a transfer valve 25. The housing 5 is so formed as to provide internal cylindrical chambers 39 and 40 adjacent each end thereof. These chambers 39 and 40 are off center relative to each other but confine a common rotor R within them.

The common rotor R is concentric to a drive shaft 17 on an axis $a$ of a fixed shaft 13 for supporting the shaft 17. The shafts 17 and 13 are supported in end covers 7 and 8 of the main housing 5 as best seen in FIGS. 1 and 4. Moreover the end covers 7 and 8 extend beyond the upper flange 6' to provide end covers for the cap 6, previously mentioned.

The closed cap 6 thus forms a housing 37 for the transfer valve 25 and the latter has end shafts 25' journaled on an axis $b$ in suitable sealed bearings provided on the end covers 7 and 8, respectively.

The end cover 7, although bolted to the end flange 5' at one side of the housing 5, has a portion 7' thereof spaced from the main housing 5 to provide a gear chamber G adjacent the same. Within this gear chamber G a gear 31, which is concentric to the drive shaft 17 and rotor R, is bolted to the latter and also to a flange forming a part of the shaft 17 as best seen in FIG. 4, for turning the gear, shaft and rotor as a unit relative to the housing 5 and cover 7. Also within the gear chamber G is a smaller gear 32 disposed concentric to the end shaft 25' and transfer valve 25 and bolted to the latter for turning therewith. The gear 32 is in mesh with the gear 31 so that the transfer valve 25 turns in unison with but opposite to the direction of rotation of the rotor. These gears 31 and 32 are calculated to turn the transfer valve 180 degrees for each 120 degrees of a turn of the rotor.

On the opposite side of the main housing 5 the end cover 8 has a peripheral flange bolted to the adjacent flange 5' and also has central portion 8' spaced from the rotor R. However, this portion 8' of the cover has a boss member 23 for receiving and supporting the reduced end 22 of the fixed support 13 for the drive shaft 17. This boss member 23 has a flange which is bolted to the portion 8' and is keyed to the reduced end 22 of the fixed support 13 for the drive shaft. In this manner the support portion 35 for the drive shaft 17 is maintained stationary relative to the main housing 5.

The support portion 13 for the drive shaft 17 is also provided with eccentric portions 14 and 15 within the housing but separated by an enlarged circular medial wall 20. The rotor R is mounted on the medial wall 20 and has sealed annular support peripherally against the internal wall of the housing 5 as at 20'. As best seen at the right hand side of FIG. 4 the rotor R has secured thereto, by bolts, the flange of a mounting sleeve 21. The mounting sleeve 21 is mounted for rotation on the boss member 23, there being a suitable bearing or bushing between them.

Again referring to FIG. 4 it will be noted that the rotor R is divided by a central partition aligned with the medial wall 20 between the eccentric portions 14 and 15 of the fixed portion of the shaft 13. In this manner the internal chambers 39 and 40 of the housing 5 are divided, one, 39, providing a compression chamber and the other, 40, providing a combustion chamber.

A compressor unit 9 is arranged in the compression chamber 39 and a power unit 10 is arranged in the combustion chamber 40. The compressor unit 9 is mounted for rotation on the eccentric portion 14 of the fixed shaft 13, there being a suitable bushing 24 therebetween. The power unit 10 is mounted for rotation on the eccentric portion 15 of the fixed shaft 13, a suitable bearing 24' being arranged between them.

The compression chamber 39 has a fuel intake port 27 communicating therewith and formed in the housing 5 tangent to the internal annular chamber 39 formed therein. The combustion chamber 40 has an exhaust port 28 communicating therewith and formed in the housing 5 tangent to the internal annular chamber 40 formed therein. These two tangent ports 27 and 28, although offset to align with the respective chambers, are disposed in a common plane P which is perpendicular to a vertical center established by an imaginary line C struck through the fixed axes $a$ and $b$ of the drive shaft 17 and the transfer valve 25 respectively as best seen in FIGS. 2 and 3. Moreover, the plane P in which the tangent ports 27 and 28 are disposed in the housing 5 is diametrically opposite the transfer valve 25. With the foregoing in mind it will be noted that the eccentric portion 14 of the shaft 13 is offset (to the left FIG. 2) relative to the vertical center C but concentric to the inner annular wall of the compression chamber 39. In like manner note in FIG. 3 that the eccentric portion 15 of the fixed shaft 13 is offset (to the right) relative to the vertical center C but concentric to the internal annular wall of the combustion chamber 40.

Each of the units 9 and 10 are identical in that each is of a lesser diameter than the internal chamber in which it is disposed. Moreover, these units are each concentric to the fixed axis $a$ of the drive shaft 17 and supporting shaft 13 therefor.

Each unit 9 and 10 is of such dimension as to have sealed bearing tangent engagement with the internal wall of the chambers 39 and 40, respectively, on that side of the housing where its inlet or exhaust portion 27 or 28 is disposed. The arrangement is such that as the rotor R turns each of the units 9 and 10 is caused to turn about the axis $a$ and within its respective chamber in relatively stationary eccentricity with respect to such chamber.

Each unit 9 and 10 is provided with a set of vanes disposed radially to turn about the respective eccentric portion 14 and 15 upon which the hub of such vanes is mounted.

In the case of the compression unit 9 there are three vanes 11 extending radially in equally spaced relation (120 degrees) from a hub portion which is mounted on the eccentric portion 14 of the fixed shaft 13. The vanes 11 extend through rockable guides 35 in the periphery of the unit 9 so as to afford sliding-rocking movement relatively between the vanes and the compression unit 9 which turns about axis $a$ while the vanes 11 turn about the shaft portion 14 which is eccentric to the axis $a$.

In the case of the combustion unit 10 there are three vanes 12 extending radially from a hub portion which is mounted on the eccentric portion 15 of the fixed shaft 13. The vanes 12 extend through rockable guides 35' which are mounted in the periphery of the unit 10 to afford sliding-rocking movement relatively between the vanes 12 and the main body of the unit 10.

It will thus be noted that as the rotor R and the units 9 and 10 turn about the fixed axis $a$ of the units 11 and 12, the vanes of which are disposed at 120 degrees with respect to each other, is thereby caused to turn about its respective eccentric mounting but concentric to the chambers 39 and 40, respectively, within which such vane unit is arranged.

The compression chamber 39 has communication with the chamber 37 of the transfer valve 25 via a port 33 which is disposed diagonally (FIG. 2) to admit fuel compressed by an oncoming vane 11 into the transfer chamber. It should here be noted that each vane 11 is provided with suitable seals at sides and end and that the end of each vane 11 is of a width such as to completely cover the port 33 at one stage of passing the same.

The combustion chamber 40 communicates with the chamber 37 of the transfer valve via a port 34 which is diagonally disposed to discharge into the combustion chamber in the general direction of rotation of the vane 12 of the power unit 10. The vanes 12 each have end and side seals and are of such a width as to completely cover the port 34 at the stage of passing the latter.

The main body of the transfer valve 25 is of lesser diameter than the chamber 37 and divided by a medial rib 37' the periphery of which has sealed bearing engagement with the internal cylindrical wall of the transfer valve chamber 37. This would normally separate the chamber 37 into two half chambers one above each of the chambers 39 and 40 in the housing 5.

The transfer valve 25 is further provided with diametrically opposite rib portions 26' which have sealed bearing engagement with the internal cylindrical wall of the transfer valve housing cap 6. Each of these rib portions 26' is of such width as to completely cover the ports 33 and 34 which are aligned at the point of entry into the chamber 37. It will thus be appreciated that the medial rib 37' and the rib portions 26' divide the chamber into four separate segmental chambers. However, the main body 25 of the transfer valve is provided with diagonal passages 26 FIG. 2A. These passages 26 are milled chordally through the main body 25 and are transverse to each other although spaced from each other on opposite sides of the axis $b$ of the transfer valve body 25. In this manner diagonal segmental quadrants of the transfer valve chamber 37 are in constant communication with each other on opposite sides of the medial rib 37'. As best seen in FIG. 2 a fuel igniting spark plug 29 is arranged with its spark gap exposed to the compression side of the transfer valve chamber 37 and a second plug 29 (dotted lines FIG. 2, fuel lines FIG. 3) has its spark gap disposed in that zone of the chamber 37 where the compressed fuel-air mixture is about to enter the passage 34 leading to the combustion chamber 40. These plugs 29—29 are timed to fire twice during each revolution of the transfer valve body 25, once during receipt of compressed fuel on each half side of the transfer valve so as to isolate the compression chamber 39 from the combustion chamber 40 during each firing time of the plugs.

Having thus described the construction of my rotary engine, the following is a description of the operation thereof.

Upon turning of the drive shaft 17, by means of a starter, crank or the like in the usual manner, the rotor R is turned in the direction of the arrows FIGS 2 and 3, to thereby cause the vane units 11 and 12 to turn about their eccentric shafts 14 and 15, respectively. As each vane 11 passes the intake port 27 suction is created to draw fuel into the compression chamber 39 from the port 27. The next successive vane 11 then confines such fuel within the compression chamber to begin to compress the fuel-air mixture just prior to the first mentioned vane 11 passing the port 33. At that time the transfer valve has begun to open admitting the fuel from the compression chamber into one side of the transfer valve chamber 37. As the dividing rib 26' passes the port 33 the compressed fuel becomes isolated from the compression chamber 39. The compressed fuel bi-passes the medial rib 37' of the transfer valve body 25 via one diagonal passage 26 to thereby enter the opposite side of the transfer valve chamber below the dividing rib 26'. The compressed fuel is now in communication with the port 34 leading to the combustion chamber 40. At that moment one of the vanes 12 of the power unit 10 is passing the port 34 and when the plugs 29 fire the compressed fuel becomes ignited and begins to expand.

As the expanding fuel exerts a force against the vane 12 the latter is driven in the direction of the arrows FIG. 2 to turn the rotor R and with it the drive shaft 17. The burned fuel in the combustion chamber 40 ultimately discharges therefrom through the exhaust port 28 as the vane 12 being driven passes the latter. The foregoing operation is repeated within each of the chambers 39 and 40 once in each 120 degrees of movement of the rotor while the transfer valve turns 180 degrees in each firing time.

Having thus described my improvements in the rotary internal combustion motor and the operation thereof it will be appreciated by those skilled in the art the construction thereof may be varied, altered and/or modified without departing from the spirit of my invention therein. I therefore desire to avail myself of all variations, alterations and/or modifications which may fairly come within the purview of the appended claims.

What I claim as new and desire to protect by Letters Patent is:

1. An internal combustion motor comprising a single main housing having a fixed shaft, one end of which is supported on one end wall of said housing and a drive shaft journaled concentric of said fixed shaft and the opposite side wall of said housing, said main housing being divided midway between its end walls into a cylindrical compression chamber and a cylindrical combustion chamber each offset eccentrically of each other on opposite sides of said fixed shaft, said fixed shaft having an eccentric portion formed thereon in and concentric to said compression chamber and an eccentric portion formed in and concentric to said compression chamber, a common rotor mounted for rotation on said fixed shaft and drivingly connected to said drive shaft for turning therewith, said rotor extending through said compression and combustion chambers and having opposite sides sealed from each other therebetween, the compression and combustion sides of said rotor each having a plurality of rockable vane guides in its periphery, a compression unit having a hub portion mounted on the eccentric portion of said fixed shaft in said compression chamber for rotation concentrically thereof and having a plurality of vanes extending radially therefrom and through each of the vane guides of the rotor therein and sealingly engaging the inner and side walls of said compression chamber, a combustion unit having a hub portion mounted on the eccentric portion of said fixed shaft in said combustion chamber for rotation concentrically thereof and having a vane extending radially through each of the vane guides of the rotor therein and sealingly engaging the inner and side walls of said compression chamber, said main housing having a fuel inlet port tangent to and opposite the eccentric deposition of said compression chamber therein and having an exhaust outlet port tangent to and opposite the eccentric disposition of said combustion chamber therein and in a common plane beneath said housing, a transfer valve mounted on said housing vertically above said fixed shaft and having a cylindrical chamber parallel to the axis of the latter, and communicating via separate ports with said compression and said combustion chambers, said transfer valve having a valve body mounted for rotation in said cylindrical chamber, a circular wall on said valve body midway its ends and diametrically opposite ribs on said valve body each sealingly engaging the internal wall of said cylindrical chamber and dividing the latter into four segmental chambers, a pair of diagonal passages formed chordally through said valve body in spaced transverse relation to each other for communicating diagonally opposite segmental chambers with each other, spark plugs having their spark gaps exposed to that pair of diagonally communicated segmental chambers communicating with said combustion chamber, and gear means on said drive shaft and said valve body for turning the latter one half revolution during movement of each vane of the compressor unit from the fuel intake to fuel compression to the port communicating with said transfer valve.

2. In a rotary internal combustion motor, in combination a housing, a cylindrical valve chamber in the housing, a circular rotable transfer valve body in the valve chamber, a circular wall on said valve body perpendicular to the axis thereof and midway between the ends thereof, said wall having a radius substantially equal to the radius of said valve chamber and dividing the valve body into two axially separated parts, each of said parts having two chambers on the outer surface thereof of lesser radius than the radius of said valve chamber, and raised portions on each of said parts intermediate said valve body chambers and of a radius substantially equal to the radius of said valve chamber, two diagonal passages through the valve, each diagonal passage connecting each valve body chamber in one of said parts of said valve body with a valve body chamber in the other part of said valve body, sealing rings in the cylindrical valve chamber engaging the outer periphery of said circular wall, seals on said raised portions of said parts of said valve body, ports into said valve chamber in alignment with said valve body chambers in one of said parts, and ports out of said valve chamber in alignment with said valve body chambers of the other of said parts.

3. An internal combustion motor comprising a single main housing having a fixed shaft, one end of which is supported on one end wall of said housing, and a drive shaft journaled concentric of said fixed shaft and the opposite side wall of said housing, said main housing being divided midway between its end walls into a cylindrical compression chamber and a cylindrical combustion chamber each offset eccentrically of each other on opposite sides of said fixed shaft and having a port communicating therewith opposite to the eccentricity thereof and in a common plane with respect to each other, a common rotor mounted on said fixed shaft and said drive shaft and drivingly connected to the latter for rotation concentric therewith, and separated into a compression unit and a combustion unit each having a plurality of rockable guides in its periphery, said fixed shaft having separate offset eccentric portions each concentric to and within the separate compression and combustion chambers, each said compression and combustion unit including a vaned hub portion mounted on the respective eccentric portion of said fixed shaft within each of said compression and combustion chambers and each having their vanes extending through the rockable guides in the periphery of the respective sides of said rotor for rotation therewith, a transfer valve mounted on said housing vertically above said fixed shaft and having a cylindrical chamber parallel to the axis of the latter and communicating via separate ports with said compression and said combustion chambers, said transfer valve having a valve body mounted for rotation in said transfer valve chamber, a circular wall on said valve body midway its ends and diametrically opposite ribs on said valve body each sealingly engaging the internal wall of said cylindrical chamber for dividing the latter into four segmental chambers, a pair of diagonal passages formed chordally through said valve body in spaced transverse relation to each other for communicating diagonally opposite segmental chambers with each other, fuel igniting plugs exposed to that pair of diagonally communicated segmental chambers communicating with said combustion chamber, and gear means on said drive shaft and said valve body for turning the latter one half revolution during movement of each vane of the compressor unit from the fuel intake to fuel compression to the port communicating with said transfer valve.

4. In a rotary internal combustion motor of the type including a rotor in side by side compression and combustion chambers of a common housing; in combination a cap on said common housing having a cylindrical valve chamber formed therein, a circular transfer valve body mounted for rotation in the valve chamber and having an outer surface of lesser radius than the radius of the latter, means for drivingly connecting said transfer valve body to said rotor for turning in timed relation therewith, a circular medial wall on said valve body perpendicular to the axis thereof and sealingly engaging the internal surface of said valve chamber for dividing the latter into two axially separated annular zones, a fuel admission port communicating one of said annular zones of said chamber with the compression chamber of the common housing for receiving compressed fuel air mixture therefrom, diametrically opposite raised portions on said valve body on each side of the medial wall thereon and sealingly engaging the internal surface of said valve chamber for dividing each of said annular zones into separate segmental chambers, two diagonal passages formed through said valve body for communicating diagonally opposite segmental chambers with each other, a fuel igniting plug having its spark gap exposed to those diagonally opposite segmental chambers which are isolated from said fuel admission port, and a port communicating the opposite annular zone of said chamber with the combustion chamber of the common housing for discharging ignited compressed fuel into the latter for driving said rotor.

References Cited by the Examiner

UNITED STATES PATENTS

| | | | |
|---|---|---|---|
| 904,974 | 11/08 | Lee | 60—39.61 |
| 1,116,471 | 11/14 | Neumeyer | 60—39.61 |
| 1,147,428 | 7/15 | Peterson | 123—8 |
| 1,661,593 | 3/28 | Bodker | 123—16 |
| 1,748,568 | 2/30 | Grover | 123—16 |
| 1,986,556 | 1/35 | Carroll | 126—16 |
| 2,075,561 | 3/37 | Wellensiek | 123—8 |
| 2,373,304 | 4/45 | Garbeth | 123—8 |

FOREIGN PATENTS 580,771  9/46  Great Britain.

KARL J. ALBRECHT, *Primary Examiner.*